United States Patent [19]
Endo et al.

[11] Patent Number: 5,353,290
[45] Date of Patent: * Oct. 4, 1994

[54] MAGNETIC RECORDER/REPRODUCER

[75] Inventors: Kazuhito Endo; Masayuki Ishida; Yoshinobu Ishida, all of Nagaokakyo, Japan

[73] Assignee: Mitsubishi Denki Kabushiki Kaisha, Tokyo, Japan

[*] Notice: The portion of the term of this patent subsequent to Aug. 3, 2010 has been disclaimed.

[21] Appl. No.: 83,780

[22] Filed: Jun. 30, 1993

Related U.S. Application Data

[63] Continuation of Ser. No. 941,012, Sep. 4, 1992, Pat. No. 5,233,480, which is a continuation of Ser. No. 732,020, Jul. 18, 1991, Pat. No. 5,146,370, which is a continuation of Ser. No. 619,625, Nov. 29, 1990, Pat. No. 5,113,293, which is a continuation of Ser. No. 486,499, Feb. 27, 1990, abandoned, which is a continuation of Ser. No. 214,275, Jun. 30, 1988, Pat. No. 4,905,100, which is a continuation of Ser. No. 19,612, Feb. 27, 1987, Pat. No. 4,835,627, which is a continuation of Ser. No. 696,051, Jan. 29, 1985, Pat. No. 4,675,754.

[30] Foreign Application Priority Data

| | | | |
|---|---|---|---|
| Feb. 21, 1984 | [JP] | Japan | 59-32130 |
| Mar. 16, 1984 | [JP] | Japan | 59-51866 |
| Mar. 30, 1984 | [JP] | Japan | 59-64584 |

[51] Int. Cl.$^5$ .................................. G11B 5/09
[52] U.S. Cl. .......................... 371/37.1; 360/32
[58] Field of Search ............... 360/32, 48; 371/37.1, 371/37.2, 37.6

[56] References Cited

U.S. PATENT DOCUMENTS

| | | | |
|---|---|---|---|
| 4,052,298 | 10/1977 | Ragle | 371/37.6 |
| 4,142,174 | 2/1979 | Chen et al. | 371/37.1 |

(List continued on next page.)

FOREIGN PATENT DOCUMENTS

| | | |
|---|---|---|
| 2443171 | 11/1979 | France . |
| 59-140742 | of 0000 | Japan . |
| 58-153213 | of 0000 | Japan . |
| 2061575 | of 0000 | Japan . |
| 58185012 | 10/1898 | Japan . |
| 56-124108 | 9/1981 | Japan . |

(List continued on next page.)

OTHER PUBLICATIONS

"On the System design and The Signal Processing of a Rota Head Data", Yoshinobu Ishida et al, Consumer Electronics Development Lab. Mitsubishi.

(List continued on next page.)

*Primary Examiner*—Vincent P. Canney
*Attorney, Agent, or Firm*—Lowe, Price, LeBlanc & Becker

[57] ABSTRACT

A magnetic recorder/reproducer converts two-channel analog signals into digital signals by a sample-and-hold-/A-D converter circuit (3) and controls addresses in a memory circuit (4) by a memory address control circuit (5), to distribute the digital signals into odd sample groups and even sample groups per each channel for arraying the odd sample groups and the even sample groups of the same channel in alternate scanning intervals, thereby to write the same in the memory circuit so that the odd samples and the even samples of the same channel are arrayed in positions separated from each other along the direction of scanning by rotary heads (10, 11). The digital signals thus permutated are modulated by a modulation circuit (7), to be recorded in a magnetic tape by the rotary heads. The digital signals reproduced by the rotary heads are demodulated by a demodulation circuit (14), to be stored in a memory circuit (15). A memory address control circuit (16) controls addresses so as to permutate samples of the reproduced digital signals stored in the memory circuit to be in the original array thereof. The reproduced digital signals read from the memory circuit are converted into analog signals by a D-A converter (18), to be outputted through a low-pass filter (19).

41 Claims, 8 Drawing Sheets

U.S. PATENT DOCUMENTS

| | | |
|---|---|---|
| 4,211,996 | 7/1980 | Nakamura ........................ 371/37.1 |
| 4,211,997 | 7/1980 | Rudnick . |
| 4,224,642 | 9/1980 | Mawatari et al. . |
| 4,506,306 | 3/1985 | Viellard ............................... 360/53 |
| 4,544,958 | 10/1985 | Odaka ................................... 360/32 |
| 4,685,004 | 8/1987 | Takahashi et al. . |

FOREIGN PATENT DOCUMENTS

| | | |
|---|---|---|
| 59-177706 | 3/1983 | Japan . |
| 58-188314 | 11/1983 | Japan . |
| 59-110012 | 6/1984 | Japan . |
| 60-93680 | 5/1985 | Japan . |
| 58-166506 | 5/1985 | Japan . |
| 60-173774 | 9/1985 | Japan . |
| 2038514 | 7/1980 | United Kingdom . |
| 2073835 | 10/1981 | United Kingdom . |

OTHER PUBLICATIONS

"On the Development of a Rotary-Head Digital Audio Tape Recorder", Yoshinobu Ishida et al, 79th Convention, Audio Engineering Society.

FIG.7

| | L CHANNEL(A) | | | | R CHANNEL(B) | | | | R CHANNEL(B) | | | | L CHANNEL(A) | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | $W_{L0}$ | $W_{L2}$ | $W_{L4}$ | $W_{L6}$ | $W_{R1}$ | $W_{R3}$ | $W_{R5}$ | $W_{R7}$ | $W_{R0}$ | $W_{R2}$ | $W_{R4}$ | $W_{R6}$ | $W_{L1}$ | $W_{L3}$ | $W_{L5}$ | $W_{L7}$ |
| 1 | $W_{L8}$ | $W_{L10}$ | $W_{L12}$ | $W_{L14}$ | $W_{R9}$ | $W_{R11}$ | $W_{R13}$ | $W_{R15}$ | $W_{R8}$ | $W_{R10}$ | $W_{R12}$ | $W_{R14}$ | $W_{L9}$ | $W_{L11}$ | $W_{L13}$ | $W_{L15}$ |
| 2 | $W_{L16}$ | $W_{L18}$ | $W_{L20}$ | $W_{L22}$ | $W_{R17}$ | $W_{R19}$ | $W_{R21}$ | $W_{R23}$ | $W_{R16}$ | $W_{R18}$ | $W_{R20}$ | $W_{R22}$ | $W_{L17}$ | $W_{L19}$ | $W_{L21}$ | $W_{L23}$ |
| 3 | $W_{L24}$ | $W_{L26}$ | $W_{L28}$ | $W_{L30}$ | $W_{R25}$ | $W_{R27}$ | $W_{R29}$ | $W_{R31}$ | $W_{R24}$ | $W_{R26}$ | $W_{R28}$ | $W_{R30}$ | $W_{L25}$ | $W_{L27}$ | $W_{L29}$ | $W_{L31}$ |
| 4 | $C_{L0}$ | $C_{L2}$ | $C_{L4}$ | $C_{L6}$ | $C_{R1}$ | $C_{R3}$ | $C_{R5}$ | $C_{R7}$ | $C_{R0}$ | $C_{R2}$ | $C_{R4}$ | $C_{R6}$ | $C_{L1}$ | $C_{L3}$ | $C_{L5}$ | $C_{L7}$ |
| | $\ell_{L0}$ | $\ell_{L2}$ | $\ell_{L4}$ | $\ell_{L6}$ | $\ell_{R1}$ | $\ell_{R3}$ | $\ell_{R5}$ | $\ell_{R7}$ | $\ell_{R0}$ | $\ell_{R2}$ | $\ell_{R4}$ | $\ell_{R6}$ | $\ell_{L1}$ | $\ell_{L3}$ | $\ell_{L5}$ | $\ell_{L7}$ |

← 1 FRAME LENGTH →
← 2 SCAN →

FIG.8

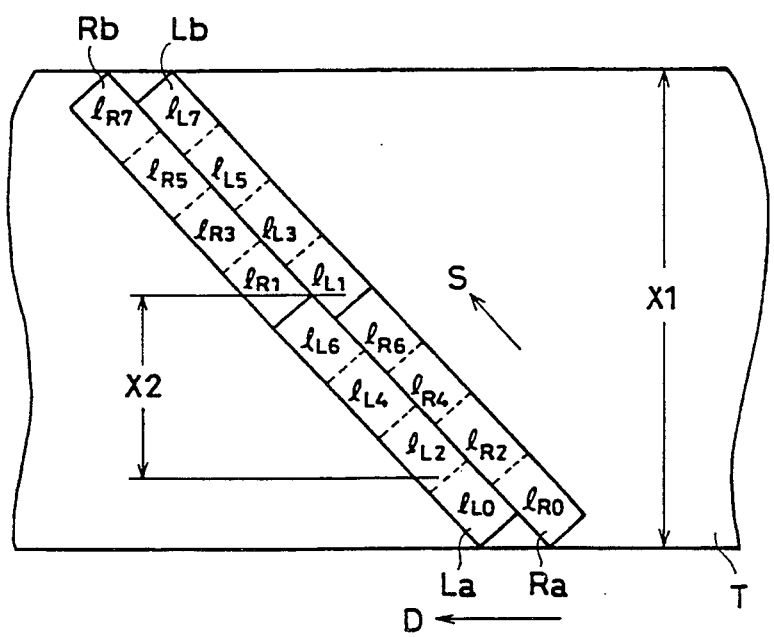

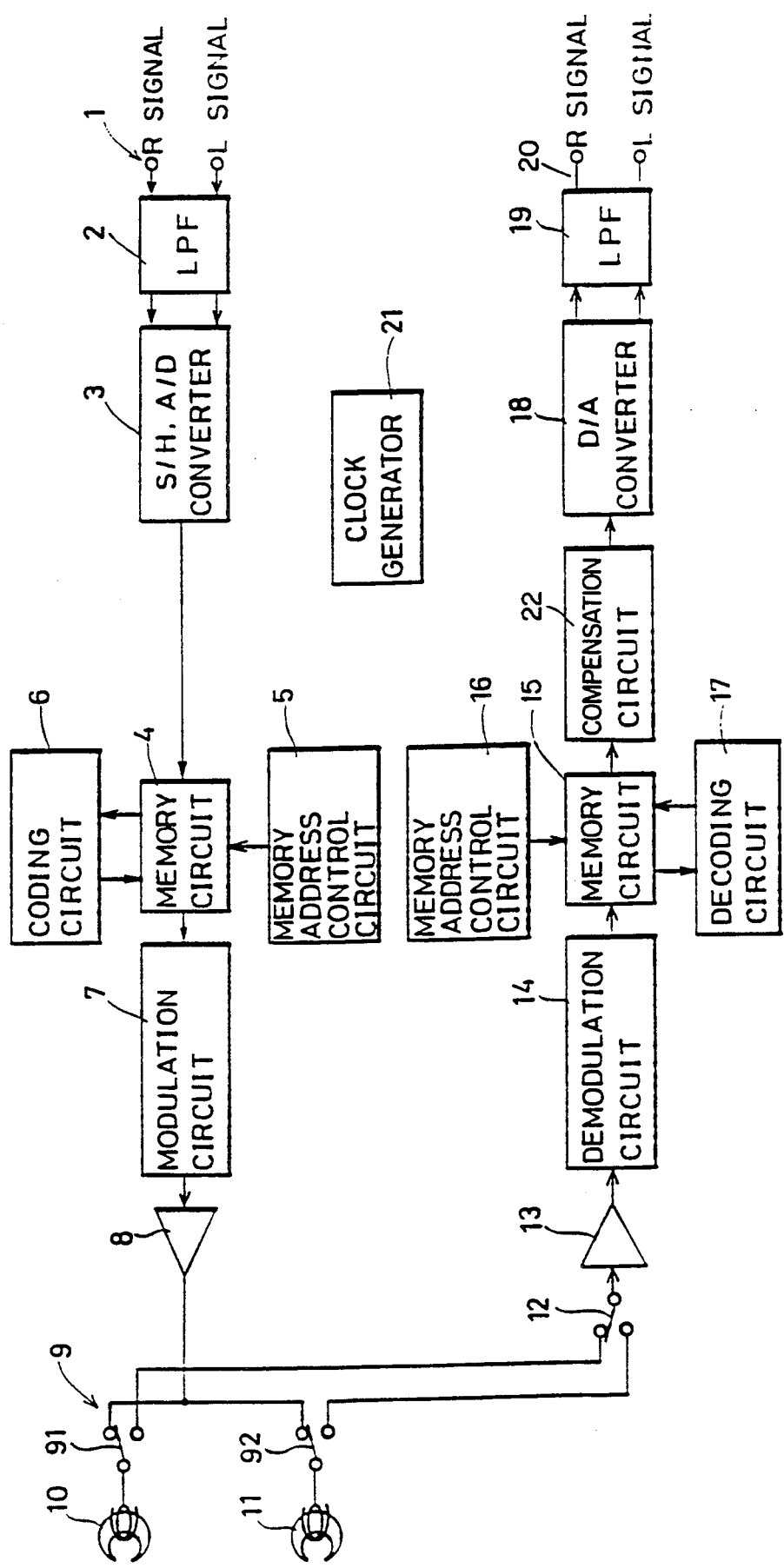

MAGNETIC RECORDER/REPRODUCER

This is a continuation of application Ser. No. 07/941,012, now U.S. Pat. No. 5,233,480 filed Sep. 4, 1992; which is a continuation of application Ser. No. 07/732,020, now U.S. Pat. No. 5,146,370, filed Jul. 18, 1991; which is a continuation of application Ser. No. 07/619,625, now U.S. Pat. No. 5,113,293, filed Nov. 29, 1990; which is a continuation of application Ser. No. 07/486,499, filed Feb. 27, 1990, now abandoned; which is a continuation of application Ser. No. 07/214,275, now U.S. Pat. No. 4,905,100, filed Jun. 30, 1988; which is a continuation of application Ser. No. 07/019,612, now U.S. Pat. No. 4,835,627, filed Feb. 27, 1987; which is a continuation of application Ser. No. 06/696,051, now U.S. Pat. No. 4,675,754, filed Jan. 29, 1985.

BACKGROUND OF THE INVENTION

1. Field of the Invention

The present invention relates to a magnetic recorder/reproducer. More specifically, it relates to a magnetic recorder/reproducer having rotary heads for slantingly or vertically scanning the same by the rotary heads thereby recording digital signals in a magnetic tape and reproducing the same, and particularly to an improvement in interleaving of the data thereof.

2. Description of the Prior Art

Heretofore well known in the art is a rotary head-type PCM magnetic recorder/reproducer which converts audio signals into digital signals for recording the digital signals in a magnetic tape and reproducing the recorded digital signals. In general, a rotary head-type PCM magnetic recorder/reproducer employs error correction codes for correcting errors caused in the data upon recording/reproducing of the magnetic tape.

The error correction codes are adapted to correct the errors caused in the data following recording/reproducing of the magnetic tape thereby to reproduce high definition audio signals. However, when the number of the errors is beyond the correction ability to disable the error correction, compensation must be performed by means such as interpolation by taking the mean value of adjacent data. Further, most of the errors caused on the magnetic tapes are burst errors, and hence the erroneous data are dispersed by interleaving processing for improving the ability of the error correction codes.

As hereinabove described, compensation processing is performed when the errors cannot be corrected, and mean value interpolation is employed as an effective compensation process with simple circuit structure. Such mean value interpolation is performed on condition that the adjacent data are correct.

Therefore, data of odd sample groups are separated as far as possible from those of even sample groups when the interleaving operation is performed.

FIGS. 1 and 2 show magnetization patterns recorded on a magnetic tape by a conventional rotary head-type PCM magnetic recorder/reproducer.

The following description is made of a rotary head-type PCM magnetic recorder/reproducer of a two-head helical scanning system, which is taken as a typical example.

In FIGS. 1 and 2, a magnetic tape T travels in the direction indicated by an arrow D and is scanned by rotary heads in the direction indicated by an arrow S. The data recorded in the magnetic tape T are of two channels A and B, and distributed into even sample groups a and odd sample groups b. For example, symbol a with symbol A+B indicates even sample groups of the channels A and B, and symbol Aa indicates an even sample group of the channel A.

The volume of interleaving is generally determined in consideration of burst length of errors and correction ability of error correction codes, and an even sample group a and an odd sample group b may be in line over a scanning interval as shown in FIG. 1 or to the contrary.

FIG. 2 shows the even sample groups a and the odd sample groups b arrayed in equally divided scanning intervals. In the interleaving operation performed in this manner, errors are caused in continuous data when one of the rotary heads is instantaneously silted by magnetic powder coming off from the magnetic tape T, i.e., when the reproduced signals from one of the rotary heads are interrupted. Thus, it has been impossible to perform the mean value interpolation, which causes harsh noise.

SUMMARY OF THE INVENTION

Accordingly, an essential object of the present invention is to provide a magnetic recorder/reproducer which can reduce noise caused by a silted rotary head and by errors in the tape travelling direction over a certain width along the cross direction of a magnetic tape.

A further object is to provide a magnetic tape wherein data is recorded in a plurality of tracks in a predetermined pattern.

In one aspect of the present invention, there is provided a magnetic recorder/reproducer which performs a coding operation so that error correction codes are completed in one scanning interval and effectively reproduces signals even if a rotary head is silted or a burst error is caused in the tape travelling direction over a certain width, thereby to prevent an increase in the clock rate required for error correction.

In another aspect of the invention there is provided a magnetic tape on which data is recorded in a plurality of tracks in accordance with predetermined pattern.

In summary, the present invention converts analog signals of a plurality of channels into digital signals to distribute the digital signals of the plurality of channels into odd sample groups and even sample groups per each channel, and permutates the sample groups so that the odd sample groups and the even sample groups of the same channel are recorded in alternate scanning intervals in positions separated along the direction of scanning thereby to record the permutated odd sample groups and the even sample groups of the respective channels in a magnetic recording medium by magnetic heads.

Therefore, according to the present invention, the signals may be readily corrected even if reproduced signals from one head are interrupted by, e.g., instantaneous silting of the head caused by magnetic powder coming off from the magnetic tape of by a burst error caused in the tape travelling direction over a wide range along the cross direction of the tape, whereby the signal-to-noise ratio of reproduced sounds or images can be improved. Further, excellent reproduced sounds and images can be obtained by properly selecting samples from the respective groups.

In a preferred embodiment of the present invention, even sample groups of a first channel and odd samples group of a second channel are arrayed in the same scanning intervals while odd sample groups of the first channel and even sample groups of the second channel are arrayed in scanning intervals adjacent to the said same scanning intervals, such that the odd sample groups and the even sample groups of the first channel are recorded in positions separated from each other along the direction of scanning. Or, the even sample groups of the first channel and the even sample groups of the second channel may be arrayed in the same scanning intervals while the odd sample groups of the first channel and the odd sample groups of the second channel are arrayed in scanning intervals adjacent to the said same scanning intervals in such a manner that the odd sample groups and the even sample groups of the first channel are recorded in positions separated along the direction of scanning.

In a second aspect of the present invention, the respective sample groups recorded in the magnetic tape in the aforementioned manner are reproduced by magnetic heads to be permutated in order of sample numbers per each channel and outputted to be converted into analog signals.

In a third aspect of the present invention, the permutated odd sample group and even sample group of each channel in each scanning interval are encoded to generate error correction codes, which are arrayed in the scanning interval including information employed for generating the error correction codes to be recorded.

Therefore, according to the present invention, the error correction codes are so generated and arrayed as to be completed with respect to the data included in one scanning interval, thereby to prevent increase in the clock rate required for encoding and decoding of the data.

The above and other objects, features, aspects and advantages of the present invention will become more apparent from the following detailed description of the present invention when taken in conjunction with the accompanying drawings.

BRIEF DESCRIPTION OF THE DRAWINGS

FIG. 7 is an illustration showing respective sample groups stored in a memory circuit as shown in FIG. 5;

FIG. 8 illustrates a magnetization pattern showing frame array recorded in the memory circuit as shown in FIG. 7;

FIG. 10 is a roughly illustrated block diagram showing another embodiment of the present invention;

DESCRIPTION OF THE PREFERRED EMBODIMENTS

Figure 1:
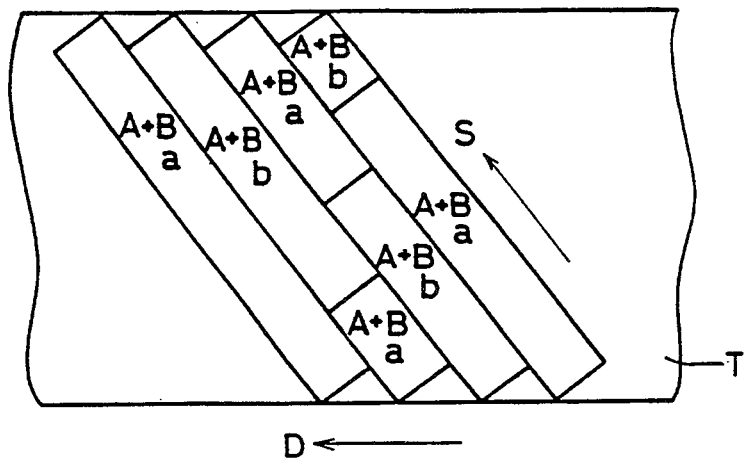
FIGS. 1 and 2 are illustrations showing conventional magnetization patterns.
Figure 2:
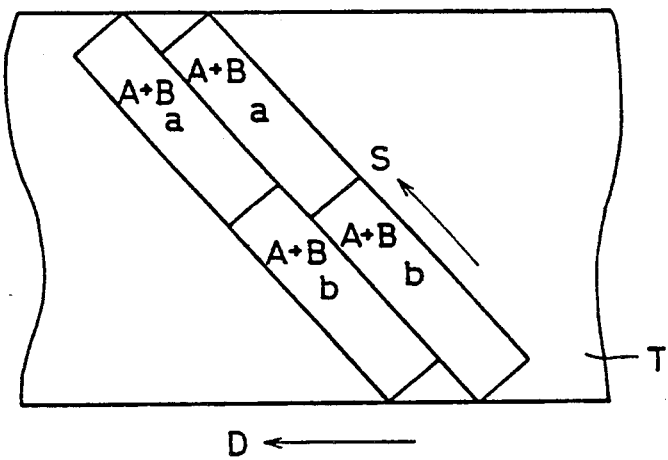
Figure 3:
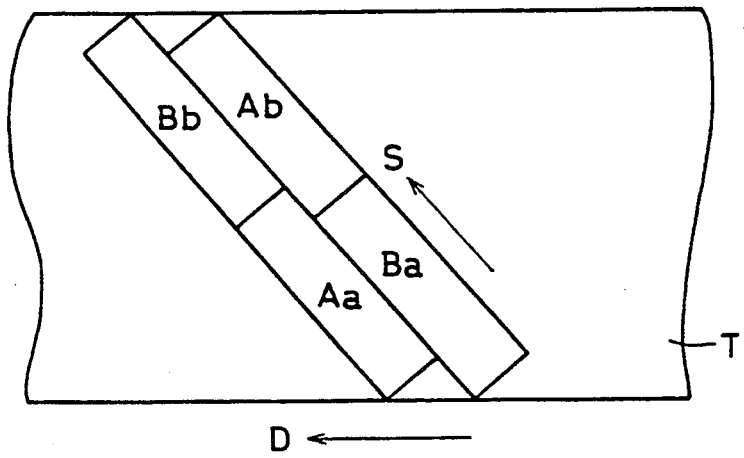
FIGS. 3 and 4 are illustrations showing magnetization patterns according to an embodiment of the present invention.

FIG. 3 is an illustration showing a magnetization pattern recorded on a magnetic tape in an embodiment of the present invention. The principle of the present invention is now described with reference to FIG. 3. In a rotary head-type magnetic recorder/reproducer according to the present invention, interleaving processing is characterized in that even sample groups and odd sample groups of the same channel are arrayed in alternate scanning intervals in positions separated from each other along the direction of scanning by rotary heads. By virtue of such array, at least either the even sample groups or the odd sample groups of the same channel can necessarily be obtained even if signals in one of two rotary heads are interrupted by the aforementioned silting, and hence no continuous sample errors are caused. Further, with respect to a burst error caused along the tape travelling direction in a certain width from the edge of the magnetic tape, either the even sample groups or the odd sample groups of the same channel can be obtained to half the width of the magnetic tape in the cross direction as shown in FIG. 3, whereby no continuous sample errors are caused in the same channel.

Figure 4:
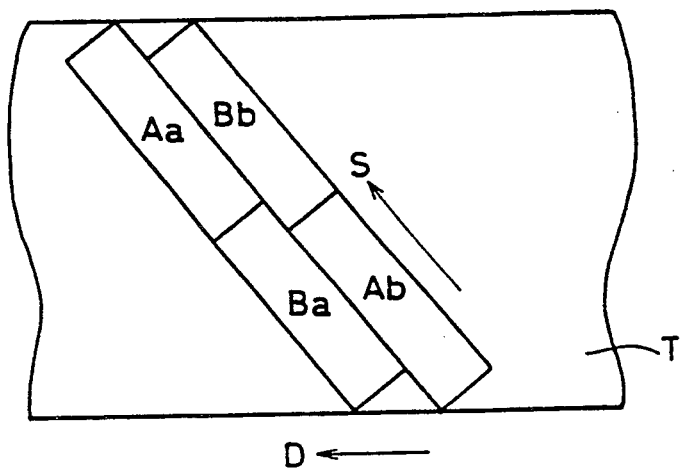

FIG. 4 is an illustration showing another example of the magnetization pattern. Also in the example as shown in FIG. 4, even sample groups and odd sample groups of the same channel are arrayed in alternate scanning intervals in positions separated from each other along the direction of scanning, and hence no sample errors are caused by interruption of signals similarly to the example as shown in FIG. 3.

Figure 6:
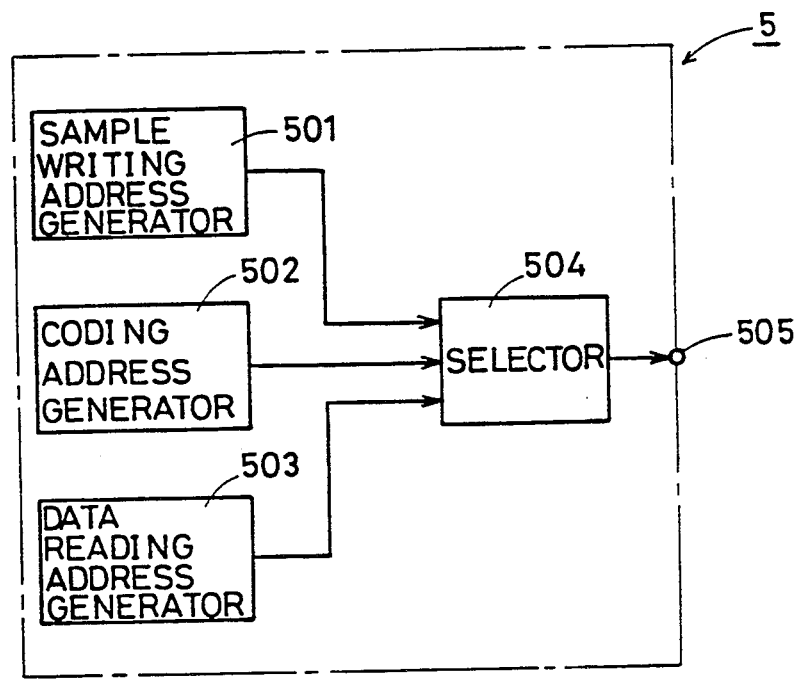
FIG. 6 is a roughly illustrated block diagram showing a memory address control circuit as shown in FIG. 5.
Figure 5:
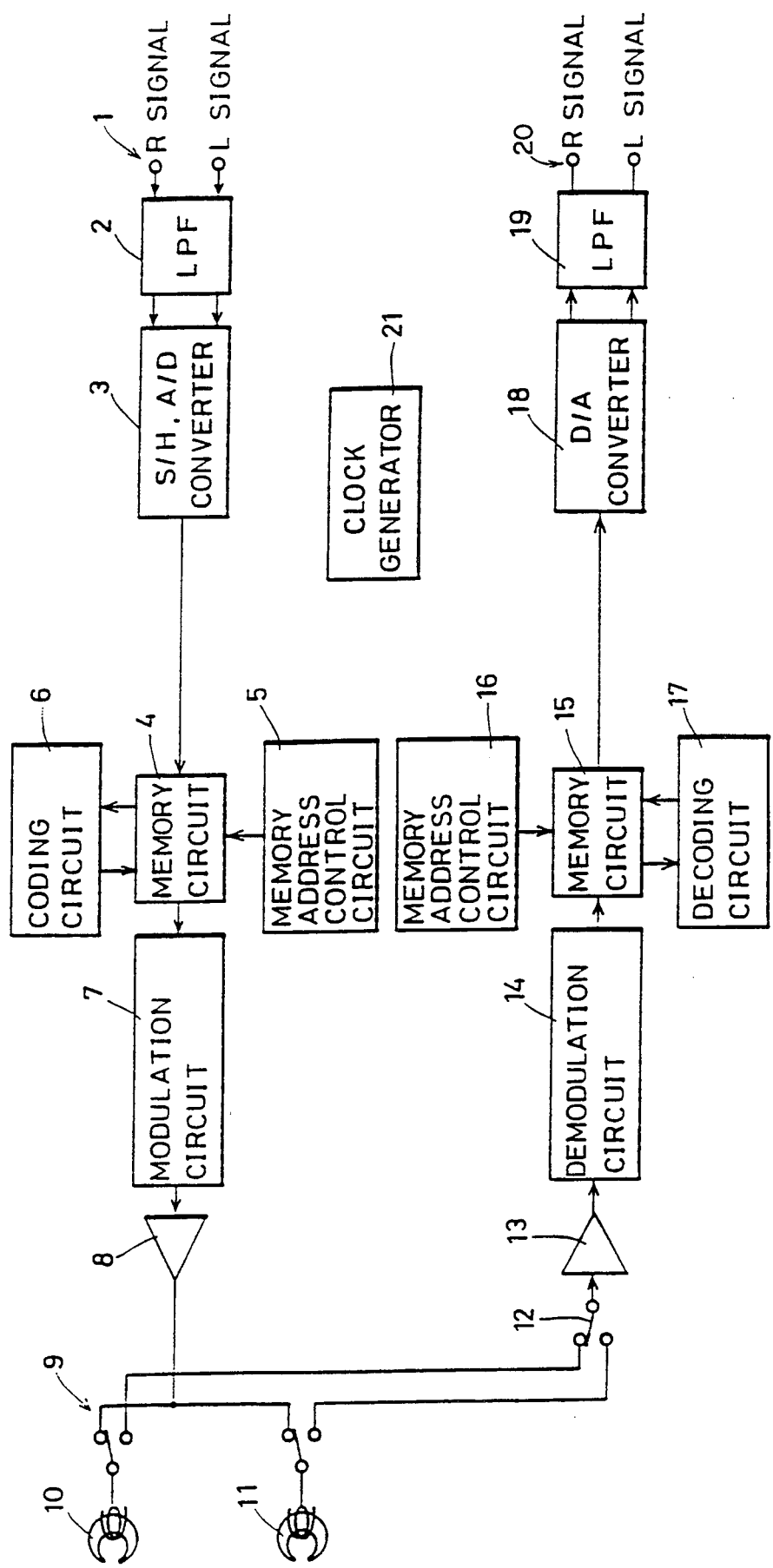
FIG. 5 is a roughly illustrated block diagram showing an embodiment of the present invention.

FIG. 5 is a roughly illustrated block diagram showing an embodiment of the present invention and FIG. 6 is a roughly illustrated block diagram showing a memory address control circuit as shown in FIG. 5.

Description is now made on structure of the present embodiment with reference to FIGS. 5 and 6. A rotary head-type PCM magnetic recorder/reproducer consists of a recording system and a reproducing system. A two-channel input terminal 1 of an audio recording system illustrating the invention receives analog audio signals. The analog audio signals inputted in the input terminal 1 are supplied to a low-pass filter 2 to be band-restricted. Then the analog audio signals passed through the low-pass filter 2 are inputted to a sample-and-hold-/A-D converter circuit 3. The sample-and-hold/A-D converter circuit 3 converts the analog audio signals into digital signals. The digitally converted signals are supplied to a memory circuit 4 to be stored therein. The memory circuit 4 is address-controlled by a memory address control circuit 5.

As shown in FIG. 6, the memory address control circuit 5 is formed by a sample writing address generator circuit 501, a coding address generator circuit 502, a data reading address generator circuit 503 and a selector 504 which receives respective outputs from the sample writing address generator circuit 501, the coding address generator circuit 502 and the data reading address generator circuit 503 for making selective outputs at an address output terminal 505. A coding circuit 6 is provided in relation to the memory circuit 4. The coding circuit 6 generates codes for correcting and detecting errors in the digital signals stored in the memory circuit 4. The digital signals read from the memory circuit 4 are supplied to a modulation circuit 7 to be modulated by the same. The modulated digital signals are amplified by a recording amplifier 8, to be supplied to either a rotary head 10 or 11 which is selected by a first selection switch 9.

The digital signals reproduced by the rotary heads 10 and 11 are inputted through a second selection switch 12 for selecting the rotary head 10 or 11 in a reproducing amplifier 13. The reproducing amplifier 13 amplifies the reproduced digital signals to supply the same to a demodulation circuit 14. The demodulation circuit 14 demodulates the reproduced digital signals, to supply the demodulated outputs to a memory circuit 15. The memory circuit 15 is connected with a memory address control circuit 16, which controls addresses of the memory circuit 15. The memory circuit 15 is further connected, to a decoding circuit 17. The decoding circuit 17 is adapted to correct and detect errors in the reproduced digital signals. The reproduced digital signals read from the memory circuit 15 are supplied to a D-A converter circuit 18, to be converted into analog signals. The converted analog signals are outputted at an output terminal 20 through a low-pass filter 19.

Operation in the recording system is now described. The input terminal 1 receives analog audio signals of left and right channels, which are respectively band-restricted by the low-pass filter 2. The outputs from the low-pass filter 2 are supplied to the sample-and-hold/A-D converter circuit 3, to be converted into digital signals $W_{Ln}$ and $W_{Rn}$. Symbol n represents order of sampling, and the analog signals of the left and right channels are subsequently sampled to be alternately outputted as digital signals $W_{L0}$, $W_{R0}$, $W_{L1}$, $W_{R1}$, $W_{L2}$, $W_{R2}$, . . . The digital signals $W_{Ln}$ and $W_{Rn}$ are supplied to the memory circuit 4 to be subsequently written in the same with memory addresses being controlled by the sample writing address generator circuit 501 of the address control circuit 5 provided in relation to the memory circuit 4. The address control operation is hereinafter described in detail.

The coding circuit 6 provided in relation to the memory circuit 4 reads necessary samples included in the digital signals stored in the memory circuit 4 for generating error correction codes and again writing the same in the memory circuit 4. The digital signals and the error correction codes are subsequently read by the address control circuit 5. The read digital signals are inputted to the modulation circuit 7, to be converted into signals appropriate for recording in the magnetic tape. The converted signals are amplified by the recording amplifier 8, to be recorded in the magnetic tape by the two rotary heads 10 and 11 through the first selection switch 9. The first selection switch 9 is adapted to switch the circuits to be connected with the rotary heads 10 and 11 in recording and reproducing of the signals.

Operation in the reproducing system is now described. The reproduced digital signals read from the two rotary heads 10 and 11 are supplied to the second selection switch 12 through the first selection switch 9. The second selection switch 12 is adapted to supply the signals read from the rotary heads 10 and 11 to the reproducing amplifier 13 as single-system signals. The reproduced digital signals are amplified by the reproducing amplifier 13, to be supplied to the demodulation circuit 14. The demodulation circuit 14 demodulates the reproduced digital signals to those before modulation, to supply the same to the memory circuit 15. The memory circuit 15 is address-controlled by the memory address control circuit 16, to write the reproduced digital signals. The decoding circuit 17 provided in relation to the memory circuit 15 reads necessary samples from the memory circuit 15 to correct and detect errors. The corrected samples in the memory circuit 15 are subsequently read therefrom by the memory address control circuit 16, to be supplied to the D-A converter circuit 18. The D-A converter circuit 18 converts the digital signals into analog signals, to supply the same to the low-pass filter 19. The low-pass filter 19 performs band restriction of the analog signals, to output the same from the output terminal 20.

A clock generator circuit 21 is adapted to generate clock pulses required for the respective components of the recording and reproducing systems.

In relation to the memory circuits 4 and 15 as shown in FIG. 5, description is now made of means for performing the aforementioned data interleaving operation employed in the rotary head-type PCM magnetic recorder/reproducer according to the present invention.

FIG. 7 is an illustration showing an example of samples stored in the memory circuit as shown in FIG. 5. In FIG. 7, the magnetic heads 10 and 11 respectively record 32 samples in the left and right channels respectively during an interval for scanning the magnetic tape. Numerals in the lateral direction indicate column unit memory addresses (hereinafter referred to as "frame addresses") and numerals in the vertical direction indicate row unit memory addresses (hereinafter referred to as "sample addresses").

In the recording system, the A-D converted and subsequently supplied samples $W_{L0}$, $W_{R0}$, $W_{L1}$, $W_{R1}$, . . . are written in the memory circuit 4 with addresses controlled by the address control circuit 5 to be in the array as shown in FIG. 6. In other words, the samples are subsequently written in the memory circuit 4 with sample address being set at 0 and the frame address being set at 0, 8, 12, 4, . . . When the frame address comes to 7 and the sample $W_{R7}$ is written in the memory circuit 4, the sample address is updated by 1 so that a given number of samples are written in the memory circuit 4 with the frame addresses being again controlled. The samples are thus arrayed in the form of a matrix of 4×16, wherein even sample groups and odd sample groups of the respective channels are separated from each other. With respect to the sample matrix thus formed, the coding circuit 6 as shown in FIG. 5 performs encoding of the samples read by the coding address generator circuit 502 of the memory address control circuit 5, whereas explanation of such encoding operation is omitted since the same is not the substance of the present invention. It is to be noted that codes $C_{Ln}$ and $C_{Rn}$ are utilized as error correction codes in the frame of units.

The data reading address generator circuit 503 of the memory address control circuit 5 subsequently reads the samples from the memory circuit 4 in the unit of frames with four vertical samples and one error correction word processed as one frame. In other words, the memory address control circuit 5 sets the frame address at 0 and subsequently updates the sample address as 0, 1, 2, . . . , and when an error correction word is read at the sample address of 4, it updates the frame address by 1 to read the samples. The data up to a frame address of 7 are arrayed in one scanning interval, and scanning of all the data in the memory circuit 4 is completed by performing the operation for two scanning intervals.

The data thus read from the memory circuit 4 are in the magnetization pattern as shown in FIG. 8 on the magnetic tape, and are arrayed as shown in FIG. 3. In the signals recorded in the aforementioned manner, no continuous error takes place even if a burst error is caused by interruption of signals in one scanning interval or in the tape travelling direction in half the width of the magnetic tape from the edge thereof, and hence compensation by mean value interpolation is enabled.

The aforementioned operation for controlling the addresses in writing of the samples in the memory circuit 4 may appropriately be changed for obtaining the magnetization pattern as shown in FIG. 4.

As hereinabove described, the present embodiment is characterized in that even samples and odd samples are permutated in groups and in that the samples in the respective groups are recorded in positions separated along the scanning direction from those in continuity therewith, as shown in FIG. 8. For example, with respect to a frame $1_{L2}$ including a sample $W_{L2}$, frames $1_{L1}$ and $1_{L3}$ including data $W_{L1}$ and $W_{L3}$ which are in continuity with the sample $W_{L2}$ are arrayed in positions separated from the frame $1_{L2}$ along the direction of scanning in FIG. 8. More specifically, the data $W_{L2}$ and $W_{L1}$ are separated from each other by a distance $X_2$, and no continuous sample error is caused due to a burst error in the tape travelling direction in a width smaller than the length $X_2$.

Assuming that $\alpha$ frames are recorded in one scanning interval, the distance $X_2$ is found as follows:

$$X_2 = (\alpha/2 - 1)X_1/\alpha$$

In practice, 200 to 300 frames are generally recorded in one scanning interval, and hence $X_2 \simeq X_1/2$, and hence no continuous sample error takes place even if an error is caused in the tape travelling direction in about half the width of the magnetic tape. Further, as hereinabove described, no continuous sample error takes place by signal interruption caused in one scanning interval, and hence compensation by mean value interpolation is enabled.

Figure 9:
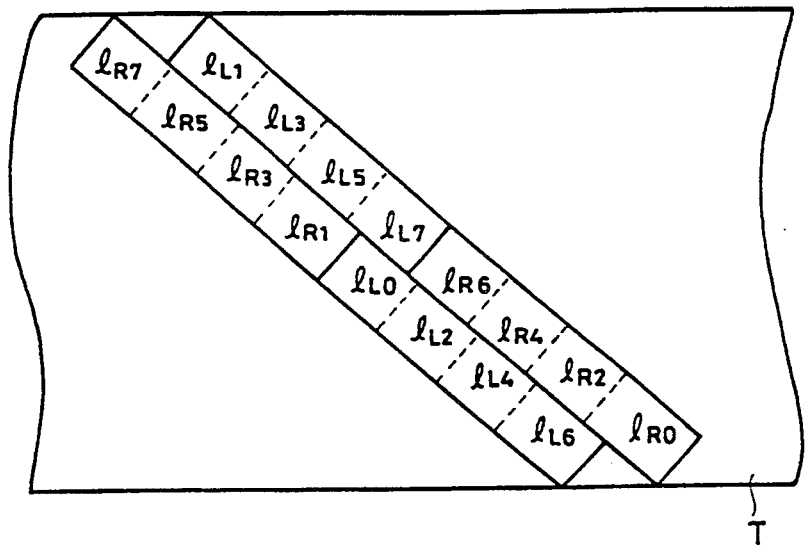
FIG. 9 is an illustration showing a magnetization pattern according to another embodiment of the present invention.

FIG. 9 is an illustration showing another example of the sample array. Although frame arrangement of the left channel in the sample array as shown in FIG. 9 is different in order from that shown in FIG. 8, a similar effect can be obtained by such array as a matter of course. The magnetization pattern as shown in FIG. 9 can be implemented by simply changing the address control circuits 5 and 16 as shown in FIG. 5.

Figure 11:
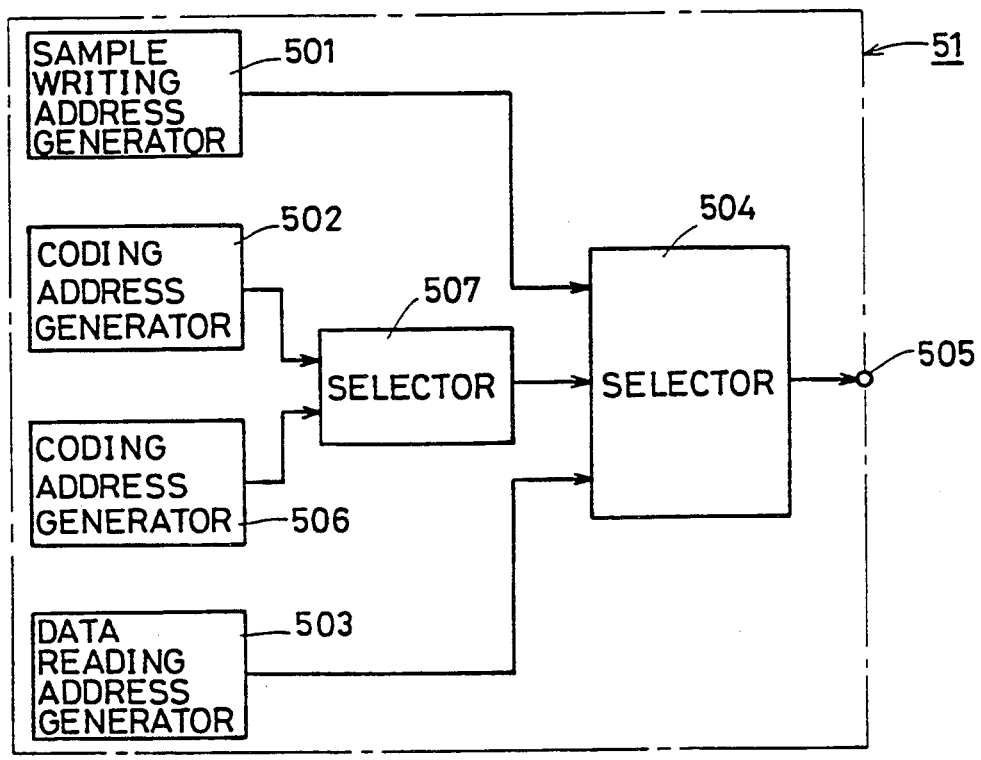
FIG. 11 is a roughly illustrated block diagram showing a memory address control circuit as shown in FIG. 10.

FIG. 10 is a block diagram showing another embodiment of the present invention, and FIG. 11 is a roughly illustrated block diagram of a memory address control circuit as shown in FIG. 10. A rotary head-type PCM magnetic recorder/reproducer as shown in FIG. 10 is substantially identical to that shown in FIG. 5 except that a compensation circuit 22 is provided between the memory circuit 15 and the D-A converter circuit 18 of the reproducing system and that a memory address control circuit 51 is structured as shown in FIG. 11. The compensation circuit 22 is adapted to perform compensation by the aforementioned mean value interpolation of samples not corrected though errors are detected.

The memory address control circuit 51 comprises a sample writing address generator circuit 501, a first coding address generator circuit 502, a data reading address generator circuit 503, a second coding address generator circuit 506, a second selector 507 for receiving and selectively outputting the outputs from the first and second coding address generator circuits 502 and 506 and a first selector 504 for receiving the outputs from the sample writing address generator circuit 501, the data reading address generator circuit 503 and the second selector 507 and selectively outputting the same at an address output terminal 505.

Figure 12:
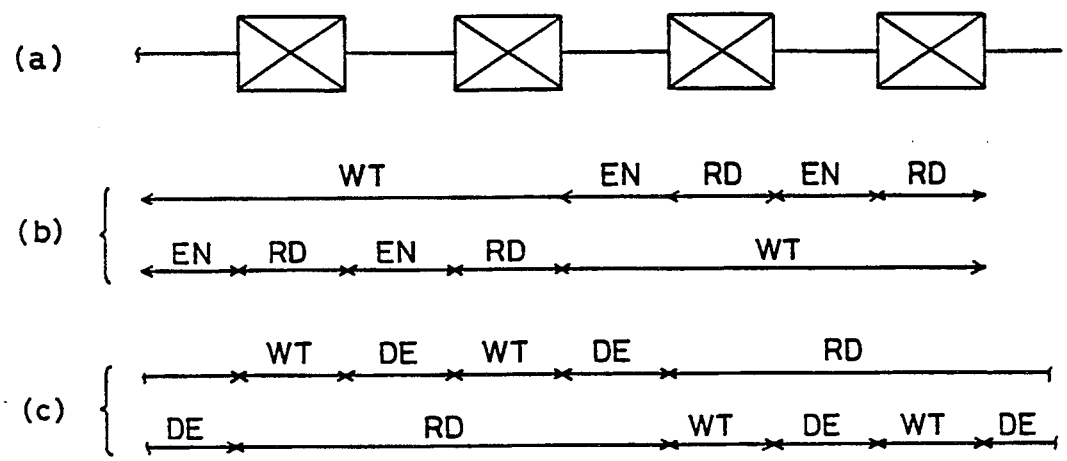
FIG. 12 is a timing chart showing operation of the memory circuits as shown in FIG. 10.

FIG. 12 is a timing chart showing operation of the memory circuits as shown in FIG. 10. In FIG. 12, the rotary head-type PCM magnetic recorder/reproducer performs two-head recording/reproducing operation by 90° tape winding, and hence signal recording/reproducing intervals of 90° and pause intervals of 90° alternately appear in the recorded/reproduced waveforms as shown in FIG. 12(a). In other words, a signal recording/reproducing interval of 90° corresponds to recording/reproducing operation in one scanning interval. Within signals for two scanning intervals sampled in a writing interval WT to the memory circuit 4 as shown in FIG. 12(b), signals for one scanning interval to be read in a reading interval RD for subsequent reading from the memory circuit 4 are encoded in an encoding interval EN to be read in the reading interval RD. Then the signals for the remaining scanning interval are encoded in the subsequent encoding interval EN, to be read in the reading interval RD.

Shown in FIG. 12(c) is the operation of the memory circuit 15 in a reproducing operation. In the writing interval WT, the reproduced sample signals for one scanning interval are written in the memory circuit 15, and are decoded in a subsequent decoding interval DE to be written in the memory circuit 15. Then the sample signals for the remaining scanning interval are written in the memory circuit 15 in the subsequent writing interval WT, to be decoded in the subsequent decoding interval DE. The decoded samples for two scanning intervals are read in the reading interval RD. In recording operation, the samples supplied as $W_{L0}$, $W_{R0}$, $W_{L1}$, . . . are subjected to memory address control by the sample writing address generator circuit 501 of the memory address control circuit 51 and written in the memory circuit 15, to be in the array as shown in FIG. 12.

Figure 13:
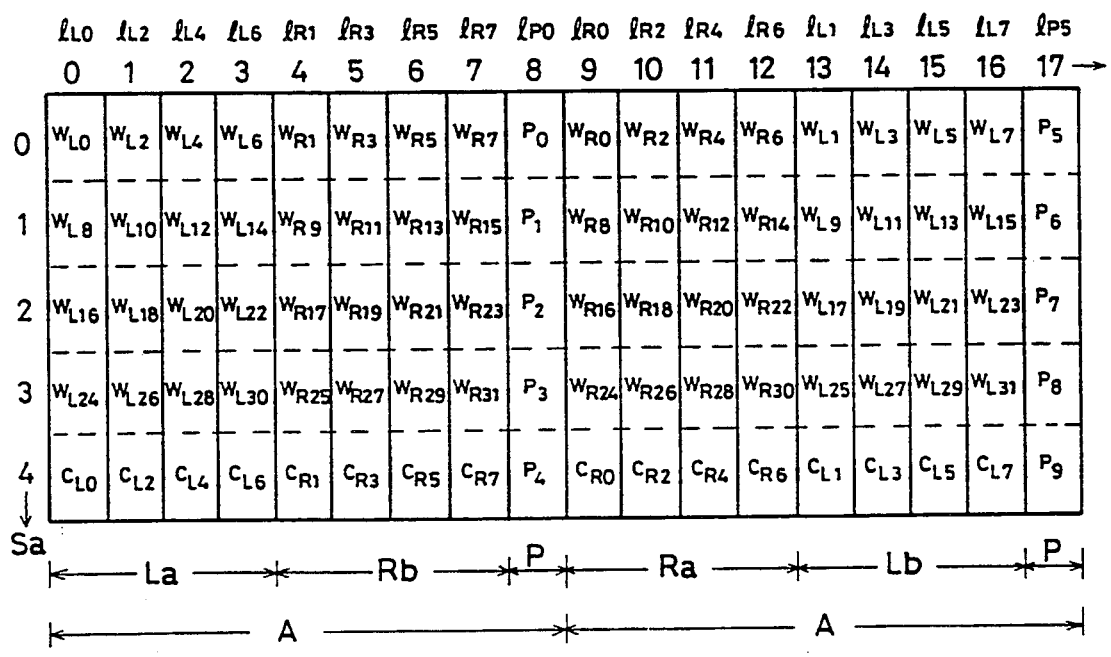
FIG. 13 is an illustration showing sample groups stored in the memory circuit as shown in FIG. 10.

FIG. 13 is an illustration showing an example of samples stored in the memory circuits as shown in FIG. 10. FIG. 13 is different from FIG. 7 in that 26 words are stored as error correction codes in addition to 32 samples of the left and right channels as data for two scanning intervals.

Operation of another embodiment of the present invention is now described with reference to FIG. 13. Encoded first are samples $1_{L0}$, $1_{L2}$, $1_{L4}$, $1_{L6}$, $1_{R1}$, $1_{R3}$, $1_{R5}$ and $1_{R7}$ to be recorded in the form of a matrix of $8 \times 4$. Then the second coding address generator circuit 506 generates error correction codes $P_0$ to $P_4$, and then generates error correction codes $C_{L0}$, $C_{L2}$, $C_{L4}$, $C_{L6}$, $C_{R1}$, $C_{R3}$, $C_{R5}$ and $C_{R7}$ with respect to samples read by the first coding address generator circuits 502. The encoded data of frame addresses of 0 to 8 are subsequently read in order of frame numbers by the data reading address generator circuit 503 of the memory address control circuit 51 in frame units, with a frame $P_o$ of the error correction code being read after a frame number 3 to be inserted between intervals La and Rb, thereby recorded in the magnetic tape.

After reading of the samples for one scanning interval is completed, the samples for the remaining scanning interval are similarly encoded to be recorded in the adjacent scanning interval. Although continuous samples in the respective groups are thus distributed in two scanning intervals, the error correction codes are completed with respect to data for one scanning interval to be recorded in the magnetic tape, and are not extended over two scanning intervals.

In a reproducing operation, the data are written in the memory circuit 15 in frame units contrary to the recording operation, are corrected by the error correction codes and subsequently are read as $W_{L0}$, $W_{R0}$, $W_{L1}$, ... . The error correction codes are completed in one scanning interval as hereinabove described, and hence the samples can be decoded upon reading of the data for one scanning interval. This operation is identical to that hereinabove described with reference to FIG. 12, and since data for two scanning intervals are gathered in codes extended over two scanning intervals, the data must be decoded with respect to two scanning intervals in the subsequent decoding interval of 90°. However, the data are decoded per scanning interval in the present embodiment, and hence the clock rate required for encoding and decoding of the data is not increased by data interleaving for two scanning intervals.

Figure 14:
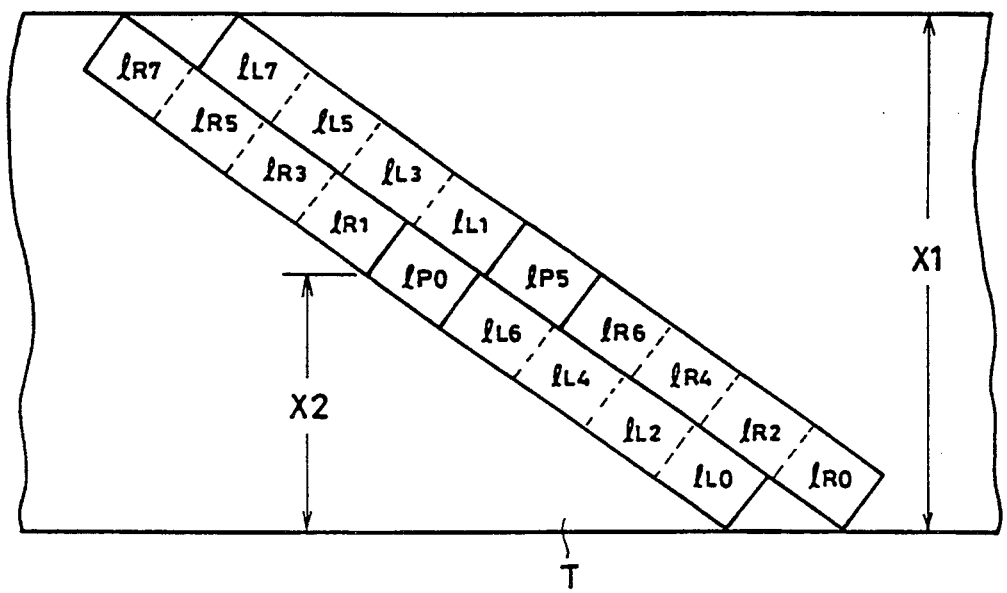
FIG. 14 illustrates a magnetization pattern showing frame array recorded by the sample groups as shown in FIG. 13.

FIG. 14 illustrates the magnetization pattern recorded on the magnetic tape by the memory circuit structure as shown in FIG. 13. In FIG. 14, symbol $X_1$ indicates the width of the magnetic tape and symbol $X_2$ indicates the width of the burst error capable of compensation by mean value interpolation. In the example as shown in FIG. 14, reading addresses in recording operation are so controlled that frames $1_{F0}$ and $1_{P5}$ of error correction codes are located in the middle of one scanning interval, although the frames $1_{F0}$ and $1_{P5}$ may be located in any position of the scanning interval.

As hereinabove described, no continuous sample errors are caused in the magnetization pattern as shown in FIG. 14 even if the signals are interrupted for one scanning interval and a burst error is caused in the tape travelling direction in half the tape width from the edge of the magnetic tape, whereby mean value interpolation is enabled.

Figure 15:
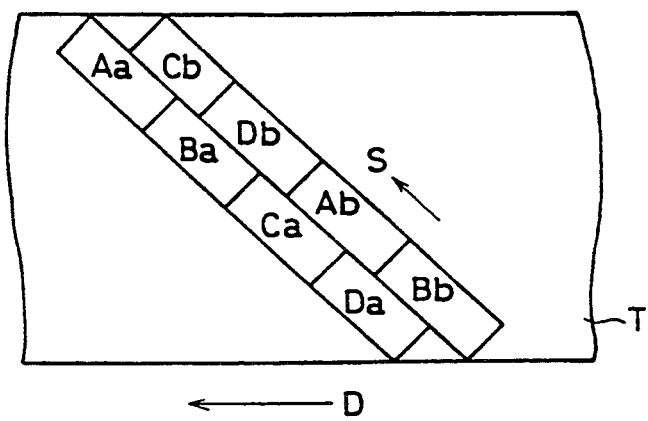
FIG. 15 is an illustration showing a magnetization pattern according to still another embodiment of the present invention.

FIG. 15 illustrates a magnetization pattern according to still another embodiment of the present invention. The magnetization pattern as shown in FIG. 15 is applied to four channels A, B, C and D. Also in the case of four channels, no continuous sample errors are caused in the respective channels even if the signals are interrupted for one scanning interval and a burst error is caused in the tape travelling direction in half the tape width from the edge of the magnetic tape, whereby mean value interpolation is enabled similarly to the case of two channels.

Although each of the above embodiments has been described with respect to a rotary head type PCM magnetic recorder/reproducer which processes audio signals, the present invention may, needless to say, be applied to a device for processing signals correctable by mean value interpolation such as video signals, and further to still other digital signal recording/reproducing systems different from the above described PCM system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rotary head type magnetic recording apparatus for recording an ordered input sequence of words represented by digital signals successively input in a unit time in a plurality of diagonal tracks on a recording medium, wherein each of said tracks includes a first region positioned in a longitudinal direction of the track at a former half thereof relative to a central portion of the track, a second region positioned at a latter half of the track relative to the central portion thereof, and a redundant data region, said first region including a plurality of m subregions ordered from 0 to m−1 in an arrangement starting from one edge of the track to the center of the track, said second region including m subregions ordered from 0 to m−1 in an arrangement starting from the center of the track to the other edge thereof, and said redundant data region including redundant data for error correction or error detection of the digital signals representing words recorded in said first and second regions on the same track with said redundant data, wherein said digital signals are recorded such that a plurality of words are arranged in each said subregion, said magnetic recording apparatus comprising:

recording signal processing means for arranging said digital signals input in the unit time to be recorded in first and second tracks, and for:

recording a first word group on the first region of said first track, a first word of said first word group having an input order of 0, said first word group including words having an order of 4n in the input sequence, where n is an integer 0, 1, 2, ... , or recording a second word group on the first region of said second track, said second word group including words having an order of 4n+1 in the input sequence, for recording a third word group on the second region of said second track, said third word group including words having an order of 4n+2 in the input sequence, and for recording a fourth word group on the second region of said first track, said fourth word group including words having an order of 4n+3 in the input sequence, said recording signal processing means supplying said digital signals such that, in each region, words of each said recorded word group are arranged on the 0th to m−1th subregions in a common ordering sequence with respect to the input order thereof, and redundant data generating means for generating redundant data for error correction or error detection of the digital signals representing words to be recorded on the same track with said redundant data.

2. A rotary head type magnetic recording apparatus as recited in claim 1, wherein each track of said recording medium includes a central region located substantially at a central portion thereof, said central region including at least part of said redundant data for error correction or error detection, and wherein said recording signal processing means further operates for recording at least part of said redundant data on the central region of the same track as the words used to generate the redundant data.

3. A rotary head type magnetic recording apparatus as recited in claim 2, wherein said recording signal processing means includes means for recording said digital signals representing successively inputted words in corresponding ones of said subregions 0, 1, ... m−1 of successive ones of first through fourth predetermined regions of a pair of tracks in accordance with an order of input of the successively inputted words represented thereby.

4. A rotary head type magnetic recording apparatus as recited in claim 3, wherein said means for recording operates to record digital signals representing a first group of four successive inputted words of the input order in said subregion 0 of said first through fourth predetermined regions, to record digital signals representing a second group of four successive inputted words, following said first group of four successive words in the input order, in said subregion 1 of said first through fourth predetermined regions, ... and to record an mth group of four successive inputted words, following an m−1th group of four successive words in the input order, in said subregion m−1 of said first through fourth predetermined regions.

5. A rotary head type magnetic recording apparatus as recited in claim 4, wherein said means for recording operates to record digital signals representing an m+1th group of four successive inputted words, following an mth group of four successive words in the input order, in said subregion 0 of said first through fourth regions, to record digital signals representing an (m+2)th group of four successive inputted words, following said m+1th group of four successive words in the input order, in said subregion 1 of said first through fourth regions, ... and to record a 2mth group of four successive inputted words, following a 2m−1th group of four successive inputted words in the input order, in said subregion m−1 of said first through fourth regions.

6. A rotary head type magnetic recording apparatus as recited in claim 5, wherein said means for recording operates to record a plurality of k sample addresses 0, 1, ..., k−1, and for recording subsequent groups of four successive words in a same subregion in subsequent sample addresses of said same subregion of successive ones of said four predetermined regions.

7. A rotary head type magnetic recording apparatus as recited in claim 5, wherein said number of subregions m in each region is defined by $m > 3$, and said number of sample addresses in each said subregion is defined by $k \geq 3$.

8. A rotary head type magnetic reproducing apparatus for reproducing digital signals by scanning diagonal tracks formed on a recording medium,
each of said tracks including a first region positioned in a longitudinal direction of the track at a former half thereof relative to a central portion of the track, a second region positioned at a latter half of the track relative to the central portion thereof, and a redundant data region,
said first region including a plurality of m subregions ordered from 0 to m−1 in an arrangement starting from one edge of the track to the center of the track, said second region including m subregions ordered from 0 to m−1 in an arrangement starting from the center of the track to the other edge thereof, and said redundant data region including redundant data for error correction or error detection of the digital signals representing words recorded in said first and second regions on the same track with said redundant data, wherein a plurality of words are previously recorded in each subregion, and signals are outputted from the subregions in a prescribed order,
said rotary head type magnetic reproducing apparatus reproducing digital signals of a unit time dispersed among respective regions of first and second tracks, comprising:
signal reproducing and processing means for receiving as inputs the digital signals reproduced by scanning said tracks, for rearranging said reproduced digital signals and for outputting an ordered output sequence of words using digital signals reproduced from said first and second tracks as a unit,
said signal reproducing and processing means including means for:
reproducing a first word group from the first region of said first track, said first word group including words having an order of 4n in the output sequence, where n is an integer 0, 1, 2, ..., a first word of said first word group having an output order of 0;
for reproducing a second word group from the first region of said second track, said second word group including words having an order of 4n+1 in the output sequence;
for reproducing a third word group from the second region of said second track, said third word group including words having an order of 4n+2 in the output sequence; and
for reproducing a fourth word group from the second region of said first track, said fourth word group including words having an order of 4n+3 in the output sequence,
means for rearranging each of the corresponding words from each of said subregions in a common rearranging and reordering sequence thereby to output said words in said ordered output sequence, and
decoding means for correcting erroneous signals from a track of the recording medium in accordance with the redundant data recorded on the same track therewith.

9. A rotary head type magnetic reproducing apparatus as recited in claim 8, wherein each track of said recording medium includes a central region located substantially at a central portion thereof, said central region including at least part of said redundant data for error correction or error detection, and wherein
said signal reproducing and processing means includes redundant data reproducing means for reproducing at least part of said redundant data from the central region of the same track as the words used to generate the redundant data.

10. A rotary head type magnetic reproducing apparatus as recited in claim 9, wherein said rearranging means includes means for reproducing said words of said word groups from corresponding ones of said subregions 0, 1, ... m−1 of successive ones of first through fourth predetermined regions of a pair of tracks to output said words in said ordered output sequence in accordance with an order of input of successively inputted words represented thereby.

11. A rotary head type magnetic reproducing apparatus as recited in claim 10, wherein said means for reproducing operates for:
reproducing words recorded in said subregion 0 of said first through fourth predetermined regions to represent a first group of four successive inputted words;
reproducing words recorded in said subregion 1 of said first through fourth predetermined regions to represent a second group of four successive inputted words following said first group of four successive words; ... and
reproducing words recorded in said subregion m−1 of said first through fourth predetermined regions to represent an mth group of four successive inputted words following an m−1th group of four successive words.

12. A rotary head type magnetic reproducing apparatus as recited in claim 11, wherein said means for reproducing operates for:
reproducing digital signals representing an m+1th group of four successive inputted words, following an mth group of four successive inputted words in the input order, from said subregion 0 of said first through fourth predetermined regions,
reproducing digital signals representing an (m+2)th group of four successive inputted words, following said m+1th group of four successive inputted words in the input order, from said subregion 1 of said first through fourth predetermined regions; ... and for
reproducing digital signals representing a 2 m the group of four successive inputted words in the input order, following a 2m−1th group of four successive inputted words in the input order, from said subregion m−1 of said first through fourth predetermined regions.

13. A rotary head type magnetic reproducing apparatus as recited in claim 12, wherein said means for reproducing operates for:
reproducing a plurality of k sample addresses 0, 1, .. ., k−1; and for
reproducing subsequent groups of four successive words from a same subregion in subsequent sample addresses of said same subregion of successive ones of said four predetermined regions.

14. A rotary head type magnetic reproducing apparatus as recited in claim 12, wherein said number of subregions m in each region is defined by $m>3,$ and said number of sample addresses in each said subregion is defined by $k \geq 3.$ 15. A rotary head type magnetic recording and reproducing apparatus for recording an ordered input sequence of words represented by digital signals successively input in a unit time in a plurality of diagonal tracks on a recording medium and for reproducing digital signals by scanning diagonal tracks formed on a recording medium,
wherein each of said tracks includes a first region positioned in a longitudinal direction of the track at a former half thereof relative to a central portion of the track, a second region positioned at a latter half of the track relative to the central portion thereof, and a redundant data region,
said first region including a plurality of m subregions ordered from 0 to m−1 in an arrangement starting from one edge of the track to the center of the track, said second region including m subregions ordered from 0 to m−1 in an arrangement starting from the center of the track to the other edge thereof, and said redundant data region including redundant data for error correction or error detection of the digital signals representing words recorded in said first and second regions on the same track with said redundant data, wherein said digital signals are recorded such that a plurality of words are arranged in each said subregion, said magnetic recording apparatus comprising:
recording signal processing means for arranging said digital signals input in the unit time to be recorded in first and second tracks, and for:
recording a first word group on the first region of said first track, a first word of said first word group having an input order of 0, said first word group including words having an order of 4n in the input sequence, where n is an integer 0, 1, 2, ... ,
for recording a second word group on the first region of said second track, said second word group including words having an order of 4n+1 in the input sequence,
for recording a third word group on the second region of said second track, said third word group including words having an order of 4n+2 in the input sequence, and
for recording a fourth word group on the second region of said first track, said fourth word group including words having an order of 4n+3 in the input sequence,
said recording signal processing means supplying said digital signals such that, in each region, words of each said recorded word group are arranged on the 0th to m−1th subregions in a common ordering sequence with respect to the input order thereof, and
redundant data generating means for generating redundant data for error correction or error detection of the digital signals representing words to be recorded on the same track with said redundant data.

16. A rotary head type magnetic recording apparatus as recited in claim 15, wherein each track of said recording medium includes a central region located substantially at a central portion thereof, said central region including at least part of said redundant data for error correction or error detection, and wherein
said recording signal processing means further operates for recording at least part of said redundant data on the central region of the same track as the words used to generate the redundant data.

17. A rotary head type magnetic recording and reproducing apparatus as recited in claim 15, further comprising signal reproducing and processing means for receiving the digital signals reproduced by scanning said tracks as inputs, for rearranging said digital signals and for outputting an ordered output sequence of words using digital signals of said first and second tracks as a unit, said signal reproducing and processing means including means for:

reproducing a first word group from the first region of said first track, said first word group including words having an order of 4n in the output sequence, where n is an integer 0, 1, 2, . . . , a first word of said first word group having an output order of 0;

for reproducing a second word group from the first region of said second track, said second word group including words having an order of 4n+1 in the output sequence;

for reproducing a third word group from the second region of said second track, said third word group including words having an order of 4n+2 in the output sequence; and for reproducing a fourth word group from the second region of said first track, said fourth word group including words having an order of 4n+3 in the output sequence; and means for rearranging each of the corresponding words from each of said subregions in a common rearranging and reordering sequence thereby to output said words in said ordered output sequence, and redundant data detecting means for reproducing redundant data recorded on a track of said recording medium for error correction or error detection of digital signals representing words recorded on the same track with said redundant data.

18. A rotary head type magnetic reproducing apparatus as recited in claim 17, further comprising decoding means for correcting erroneous signals from a track of the recording medium in accordance with the redundant data recorded on the same track therewith.

19. A rotary head type magnetic reproducing apparatus as recited in claim 17, wherein each track of said recording medium includes a central region located substantially at a central portion thereof, said central region including at least part of said redundant data for error correction or error detection, and wherein said signal reproducing and processing means includes redundant data reproducing means for reproducing at least part of said redundant data from the central region of the same track as the words used to generate the redundant data.

20. A rotary head type magnetic recording and reproducing apparatus as recited in claim 19, wherein said rearranging means includes means for reproducing said words of said word groups from corresponding ones of said subregions 0, 1, . . . m−1 of successive ones of first through fourth predetermined regions of a pair of tracks to output said words in said ordered output sequence in accordance with an order of input of successively inputted words represented thereby.

21. A rotary head type magnetic recording and reproducing apparatus as recited in claim 20, wherein said means for reproducing operates for:

reproducing words recorded in said subregion 0 of said first through fourth predetermined regions to represent a first group of four successive inputted words;

reproducing words recorded in said subregion 1 of said first through fourth predetermined regions to represent a second group of four successive inputted words following said first group of four successive words; . . . and reproducing words recorded in said subregion m−1 of said first through fourth predetermined regions to represent an mth group of four successive inputted words following an m−1th group of four successive words.

22. A rotary head type magnetic recording and reproducing apparatus as recited in claim 21, wherein said means for reproducing operates for:

reproducing digital signals representing an m+1th group of four successive inputted words, following an mth group of four successive inputted words in the input order, from said subregion 0 of said first through fourth predetermined regions, reproducing digital signals representing an (m+2)th group of four successive inputted words, following said m+1th group of four successive inputted words in the input order, from said subregion 1 of said first through fourth predetermined regions; . . . and for reproducing digital signals representing a 2mth group of four successive inputted words in the input order, following a 2m−1th group of four successive inputted words in the input order, from said subregion m−1 of said first through fourth predetermined regions.

23. A rotary head type magnetic recording and reproducing apparatus as recited in claim 22, wherein said means for reproducing operates for:

reproducing a plurality of k sample addresses 0, 1, . . . , k−1; and for reproducing subsequent groups of four successive words from a same subregion in subsequent sample addresses of said same subregion of successive ones of said four predetermined regions.

24. A rotary head type magnetic recording and reproducing apparatus as recited in claim 22, wherein said number of subregions m in each region is defined by $$m>3,$$

and said number of sample addresses in each said subregion is defined by $$k \geq 3.$$

25. A method for recording in a plurality of diagonal tracks on a recording medium an ordered input sequence of words using a rotary head type magnetic recording apparatus, said words represented by digital signals successively input in a unit time, wherein each of said tracks includes a first region positioned in a longitudinal direction of the track at a former half thereof relative to a central portion of the track, a second region positioned at a latter half of the track relative to the central portion thereof, and a redundant data region, comprising the steps of:

defining a plurality of m subregions from 0 to m−1 in said first region in an arrangement starting from one edge of the track to the center of the track, defining a plurality of m subregions from 0 to m−1 in said second region in an arrangement starting from the center of the track to the other edge thereof, defining said redundant data region to include redundant data for error correction or error detection of the digital signals representing words recorded in said first and second regions on the same track with said redundant data, and recording said digital signals such that a plurality of words are arranged in each said subregion, said recording step including arranging said digital signals input in the unit time to be recorded in first and second tracks, and:

recording a first word group on the first region of said first track, said first word group including words having an order of 4n in the input sequence, where n is an integer 0, 1, 2, ..., a first word of said first word group having an input order of 0;

recording a second word group on the first region of said second track, said second word group including words having an order of 4n+1 in the input sequence;

recording a third word group on the second region of said second track, said third word group including words having an order of 4n+2 in the input sequence;

recording a fourth word group on the second region of said first track, said fourth word group including words having an order of 4n+3 in the input sequence, in each region, arranging words of each said recorded word group on the 0th to m−1th subregions in a common ordering sequence with respect to the input order thereof, and recording redundant data in said redundant data region for error correction or error detection of the digital signals representing words recorded on the same track with said redundant data.

26. A method for recording an ordered sequence of words as recited in claim 25, wherein each track of said recording medium includes a central region located substantially at a central portion thereof, said central region including at least part of said redundant data for error correction or error detection, and wherein said step of recording redundant data comprises recording at least part of said redundant data on the central region of the same track as the words used to generate the redundant data.

27. A method for recording an ordered sequence of words as digital signals as recited in claim 26, wherein said step of arranging comprises recording said digital signals representing successively inputted words in corresponding ones of said subregions 0, 1, ... m−1 of successive ones of first through fourth predetermined regions of a pair of tracks, in accordance with the input order of the successively inputted words represented by said digital signals.

28. A method for recording an ordered sequence of words as digital signals as recited in claim 27, wherein said step of arranging further comprises:

recording digital signals representing a first group of four successive inputted words of the input order in said subregion 0 of said first through fourth predetermined regions, recording digital signals representing a second group of four successive inputted words, following said first group of four successive words of the input order, in said subregion 1 of said first through fourth regions, ... and recording digital signals representing an mth group of four successive inputted words, following an m−1th group of four successive words of the input order, in said subregion m−1 of said first through fourth regions.

29. A method for recording an ordered sequence of words as digital signals as recited in claim 28, wherein said step of recording digital signals includes the steps of:

recording digital signals representing an m+1th group of four successive inputted words, following an mth group of four successive words in the input order, in said subregion 0 of said first through fourth regions;

recording digital signals representing an (m+2)th group of four successive inputted words, following said m+1th group of four successive words in the input order, in said subregion 1 of said first through fourth regions; ... and recording a 2mth group of four successive inputted words, following a 2m−1th group of four successive inputted words in the input order, in said subregion m−1 of said first through fourth regions.

30. A method for recording an ordered sequence of words as digital signals as recited in claim 29, wherein said step of recording digital signals comprises recording a plurality of k sample addresses 0, 1, ..., k−1; and recording subsequent groups of four successive words in a same subregion in subsequent sample addresses of said same subregion of successive ones of said four predetermined regions.

31. A method for recording an ordered sequence of words as digital signals as recited in claim 29, wherein said number of subregions m in each region is defined by $$m > 3,$$

and said number of sample addresses in each said subregion is defined by $$k \geq 3.$$

32. A method for reproducing digital signals by scanning diagonal tracks formed on a recording medium using a rotary head type magnetic reproducing apparatus, wherein each of said tracks includes a first region positioned in a longitudinal direction of the track at a former half thereof relative to a central portion of the track, a second region positioned at a latter half of the track relative to the central portion thereof, and a redundant data region, said first region including a plurality of m subregions ordered from 0 to m−1 in an arrangement starting from one edge of the track to the center of the track, said second region including m subregions ordered from 0 to m−1 in an arrangement starting from the center of the track to the other edge thereof, and said redundant data region including redundant data for error correction or error detection of the digital signals representing words recorded in said first and second regions on the same track with said redundant data, a plurality of words being previously recorded in each subregion, the method comprising:

outputting signals from the subregions in a prescribed order by using said rotary head type magnetic reproducing apparatus for reproducing digital signals of a unit time dispersed among respective regions of first and second tracks, said reproducing step including rearranging said reproduced digital signals for outputting an ordered output sequence of words using digital signals reproduced from said first and second tracks as a unit, said rearranging step including reproducing a first word group from the first region of said first track, providing to words in said first word group an order of 4n in the output sequence, where n is an integer 0, 1, 2, . . . , and providing to a first word of said first word group an output order of 0;

reproducing a second word group from the first region of said second track, providing to words in said second word group an order of 4n+1 in the output sequence, reproducing a third word group from the second region of said second track, providing to words in said third word group an order of 4n+2 in the output sequence, reproducing a fourth word group from the second region of said first track, providing to words in said fourth word group an order of 4n+3 in the output sequence, rearranging each of the corresponding words from each of said subregions in a common rearranging and reordering sequence thereby to output said words in said ordered output sequence, and correcting erroneous signals from a track of the recording medium in accordance with the redundant data recorded on the same track therewith.

33. A rotary head type magnetic reproducing apparatus as recited in claim 32, wherein each track of said recording medium includes a central region located substantially at a central portion thereof, said central region including at least part of said redundant data for error correction or error detection, and wherein comprising the further step of reproducing at least part of said redundant data from the central region of the same track as the words used to generate the redundant data.

34. A method for reproducing digital signals as recited in claim 33, wherein said step of rearranging includes the step of reproducing said words of said word groups from corresponding ones of said subregions 0, 1, . . . m−1 of successive ones of first through fourth predetermined regions of a pair of tracks to output said words in said ordered output sequence in accordance with an input order of successively inputted words represented thereby.

35. A method for reproducing digital signals as recited in claim 34, wherein said step of reproducing comprises:

reproducing words recorded in said subregion 0 of said first through fourth predetermined regions to represent a first group of four successive inputted words of the input order, reproducing words recorded in said subregion 1 of said first through fourth predetermined regions to represent a second group of four successive inputted words following said first group of four successive words of the input order, . . . and reproducing words recorded in said subregion m−1 of said first through fourth predetermined regions to represent an mth group of four successive inputted words following an m−1th group of four successive words of the input order.

36. A method for reproducing digital signals as recited in claim 35, wherein said step of reproducing further comprises:

reproducing digital signals representing an m+1th group of four successive inputted words, following an mth group of four successive inputted words in the input order, from said subregion 0 of said first through fourth predetermined regions, reproducing digital signals representing an (m+2)th group of four successive inputted words, following said m+1th group of four successive inputted words in the input order, from said subregion 1 of said first through fourth predetermined regions; . . . and for reproducing digital signals representing a 2mth group of four successive inputted words in the input order, following a 2m−1th group of four successive inputted words in the input order, from said subregion m−1 of said first through fourth predetermined regions.

37. A method for reproducing digital signals as recited in claim 36, wherein said step of reproducing further comprises:

reproducing a plurality of k sample addresses 0, 1, . . . , k−1; and reproducing subsequent groups of four successive words from a same subregion in subsequent sample addresses of said same subregion of successive ones of said four predetermined regions.

38. A method for reproducing digital signals as recited in claim 36, wherein said number of subregions m in each region is defined by $m>3,$ and said number of sample addresses in each said subregion is defined by $k\leq 3.$ 39. A magnetic tape wherein magnetic patterns corresponding to digital signals are arrayed on a plurality of different tracks, said magnetic tape defining a scanning direction substantially perpendicular to a travel direction thereof and including:

a record pattern wherein an ordered input sequence of words represented by digital signals successively input in a unit time are represented by magnetic word patterns arrayed in a plurality of diagonal tracks on the tape, wherein each of said tracks includes a first region positioned in a longitudinal direction of the track at a former half thereof relative to a central portion of the track and a second region positioned at a latter half of the track relative to the central portion thereof, said first region including a plurality of m subregions ordered from 0 to m−1 in an arrangement starting from one edge of the track to the center of the track, and said second region including m subregions ordered from 0 to m−1 in an arrangement starting from the center of the track to the other edge thereof, wherein a plurality of magnetic word patterns are arranged in each of said subregions, magnetic word patterns corresponding to digital signals input in the unit time are positioned in first and second tracks, a magnetic pattern corresponding to a first word group is positioned on the first region of said first track, a magnetic word pattern corresponding to a first word of said first word group having an input order of 0, said first word group pattern including magnetic word patterns corresponding to words having an order of 4n in the input sequence, where n is an integer 0, 1, 2, . . . , a magnetic pattern corresponding to a second word group is positioned on the first region of said second track, said second word group pattern including magnetic word patterns corresponding to words having an order of 4n+1 in the input sequence, a magnetic pattern corresponding to a third word group is positioned on the second region of said second track, said third word group pattern including magnetic word patterns corresponding to words having an order of 4n+2 in the input sequence, and a magnetic pattern corresponding to a fourth word group is positioned on the second region of said first track, said fourth word group pattern including magnetic word patterns corresponding to words having an order of 4n+3 in the input sequence, in each region, magnetic word patterns of each said word group pattern being arranged on the 0th to m−1th subregions in a common ordering sequence with respect to the input order thereof.

40. A magnetic tape wherein magnetic patterns corresponding to digital signals are arrayed on a plurality of different tracks, said magnetic tape defining a scanning direction substantially perpendicular to a travel direction thereof and including:

a record pattern wherein an ordered input sequence of words represented by digital signals successively input in a unit time are represented by magnetic word patterns arrayed in a plurality of diagonal tracks on the tape, wherein each of said tracks includes a first region positioned in a longitudinal direction of the track at a former half thereof relative to a central portion of the track, a second region positioned at a latter half of the track relative to the central portion thereof, and a redundant data region, said first region including a plurality of m subregions ordered from 0 to m−1 in an arrangement starting from one edge of the track to the center of the track, said second region including m subregions ordered from 0 to m−1 in an arrangement starting from the center of the track to the other edge thereof, and said redundant data region including a redundant data magnetic pattern for error correction or error detection of the digital signals representing words recorded as magnetic word patterns in said first and second regions on the same track with said redundant data magnetic pattern, wherein a plurality of magnetic word patterns are arranged in each of said subregions, magnetic word patterns corresponding to digital signals input in the unit time are positioned in first and second tracks, a magnetic pattern corresponding to a first word group is positioned on the first region of said first track, a magnetic word pattern corresponding to a first word of said first word group having an input order of 0, said first word group pattern including magnetic word patterns corresponding to words having an order of 4n in the input sequence, where n is an integer 0, 1, 2, . . . , a magnetic pattern corresponding to a second word group is positioned on the first region of said second track, said second word group pattern including magnetic word patterns corresponding to words having an order of 4n+1 in the input sequence, a magnetic pattern corresponding to a third word group is positioned on the second region of said second track, said third word group pattern including magnetic word patterns corresponding to words having an order of 4n+2 in the input sequence, and a magnetic pattern corresponding to a fourth word group is positioned on the second region of said first track, said fourth word group pattern including magnetic word patterns corresponding to words having an order of 4n+3 in the input sequence, in each region, magnetic word patterns of each said word group pattern being arranged on the 0th to m−1th subregions in a common ordering sequence with respect to the input order thereof.

41. A magnetic tape as recited in claim 33, wherein each track of said recording medium includes a central region located substantially at a central portion thereof, said central region including at least part of said redundant data magnetic pattern for error correction or error detection, and wherein at least part of said redundant data magnetic pattern is positioned on the central region of the same track as the magnetic word patterns used to generate the redundant data.

* * * * *